(12) United States Patent
Rudish (10) Patent No.: US 6,198,436 B1
(45) Date of Patent: Mar. 6, 2001

(54) INTEGRATED INTERFEROMETER AND INSTANTANEOUS FREQUENCY MEASUREMENT DEVICE AND METHOD

(75) Inventor: Ronald Rudish, Commack, NY (US)

(73) Assignee: Ail Systems, Inc., Deer Park, NY (US)

( * ) Notice: Subject to any disclaimer, the term of this patent is extended or adjusted under 35 U.S.C. 154(b) by 0 days.

(21) Appl. No.: 09/240,462

(22) Filed: Jan. 29, 1999

(51) Int. Cl.$^7$ .................................................. G01S 5/02
(52) U.S. Cl. ........................ 342/424; 342/385; 342/417; 342/422; 342/423
(58) Field of Search .................................. 342/385, 417, 342/422, 423, 424, 13, 432, 442, 443, 444, 434

(56) References Cited

U.S. PATENT DOCUMENTS

| | | | |
|---|---|---|---|
| 4,481,519 | * 11/1984 | Margerum | 342/434 |
| 5,315,307 | * 5/1994 | Tsui et al. | 342/444 |
| 5,563,982 | 10/1996 | Wang et al. | |

* cited by examiner

Primary Examiner—Bernarr E. Gregory
(74) Attorney, Agent, or Firm—Hoffmann & Baron, LLP (57) ABSTRACT

An integrated receiver includes an Instantaneous Frequency Measurement (IFM) device, an interferometer and switches. The IFM receives signals from a target and determines the frequency of the signals. The IFM includes the shared N-channel phase receiver. The interferometer also receives the signals from the target and determines the angle-of-arrival (AOA) of the signals. The interferometer includes the shared N-channel phase receiver and shares the shared N-channel phase receiver with the IFM. The switches selectively connect the shared N-channel phase receiver to the IFM when the IFM is determining the frequency of the signals, and selectively connect the shared N-channel phase receiver to the interferometer when the interferometer is determining the AOA of the signals. The shared N-channel phase receiver determines phase information indicative of the frequency of the signals and the AOA of the signals. A method for calculating the frequency and the AOA of the signals from the target includes the steps of receiving the signals, determining the frequency of the signals using the shared N-channel phase receiver, and determining the AOA of the signals using the shared N-channel phase receiver.

22 Claims, 8 Drawing Sheets

INTEGRATED INTERFEROMETER AND INSTANTANEOUS FREQUENCY MEASUREMENT DEVICE AND METHOD

BACKGROUND OF THE INVENTION

1. Field of the Invention

The present invention relates generally to Electronic Surveillance Measurement (ESM) receivers and more particularly relates to the use of phase receivers in determining frequency and angle-of-arrival (AOA) in ESM receivers.

2. Description of the Prior Art

Figure 1A:
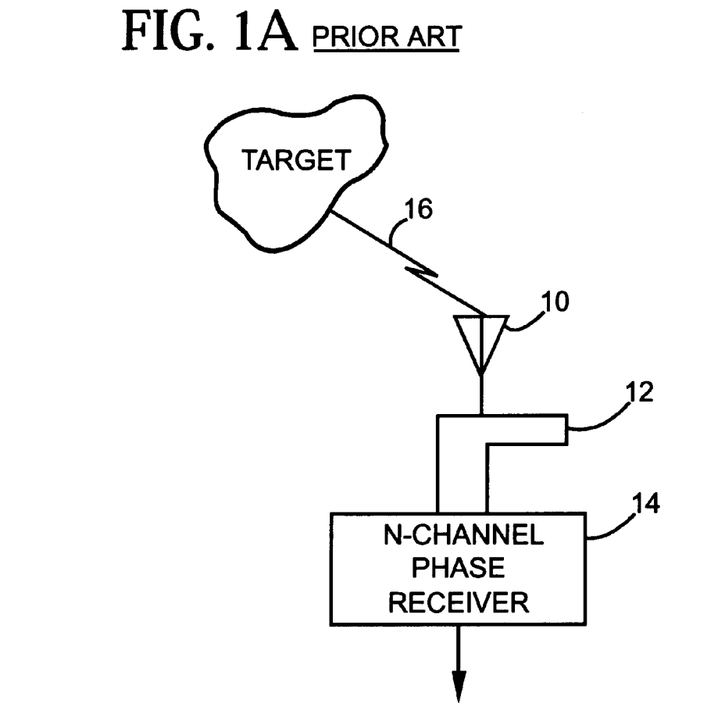
FIG. 1A is a block diagram of an Instantaneous Frequency Measurement Device (IFM) of the prior art.
Figure 1B:
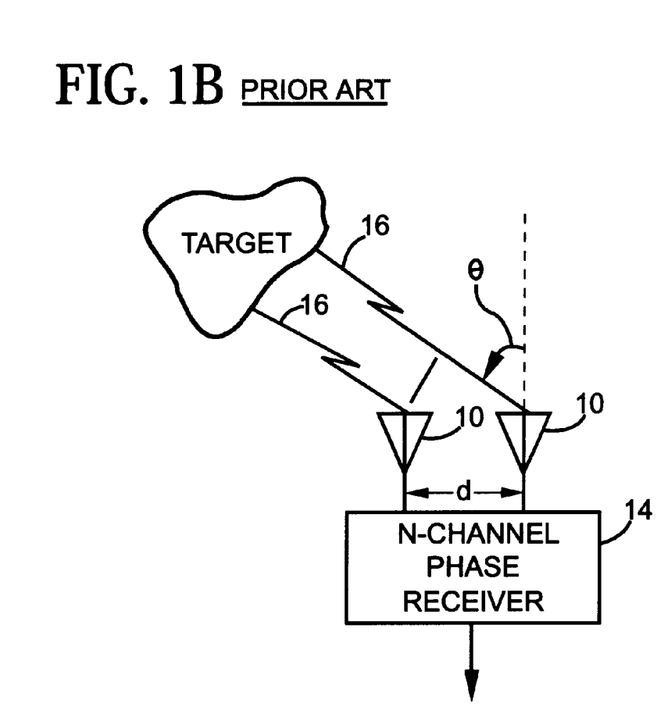
FIG. 1B is a block diagram of an interferometer of the prior art.

Electronic Surveillance Measurement (ESM) receivers commonly require that both frequency and angle-of-arrival (AOA) calculations be performed on input signals from targets of interest. Usually, frequency is measured first, with the measurement spanning a wide instantaneous bandwidth to maximize probability of signal intercept. After a signal of interest is detected and its frequency is determined, the bandwidth of measurement is narrowed substantially for the determination of AOA. Centering a narrow measurement band around the signal frequency improves signal separation in a multi-signal environment, and reduces the influence of receiver noise on the accuracy of the AOA measurement. Prior art uses separate systems to measure each of these two parameters. The frequency of the input signals is often measured using an Instantaneous Frequency Measurement (IFM) device as illustrated in FIG. 1A. The AOA is typically measured using an interferometer as illustrated in FIG. 1B. Both the IFM and the interferometer use the difference in phase between the received input signals to calculate the frequency and the AOA of the input signals.

The IFM illustrated in FIG. 1A includes a receptor element 10, a delay line 12 and an N-channel phase receiver 14. The input signals 16 are received from the target by the receptor element 10, such as an antenna. The received input signals 16 are then applied to the delay line 12, which provides two or more output signals delayed in time and thus relative phases, to the N-channel phase receiver 14. The frequency of the received input signals 16 are determined by the difference in phase between inputs to the N-channel phase receiver 14 by means well known in the art. Phase receivers are alternatively referred to as phase discriminators, phase correlators or quadrature mixers. Further detail regarding phase receivers is presented in the product specification catalog entitled *Anaren RF & Microwave Components*, February 1997, distributed by Anaren Microwave, Inc., 6635 Kirkville Road, East Syracuse, N.Y. 13057, which is hereby incorporated by reference in its entirety.

The interferometer illustrated in FIG. 1B includes the receptor elements 10 (such as antennas), and the N-channel phase receiver 14. The receptor elements 10 are offset by a predetermined distance d. The interferometer uses the difference in phase between the input signals received by the offset receptor elements 10 to determine the AOA. The sine of the AOA θ of the input signals 16 is proportional to the phase difference between the input signals received by the offset receptor elements 10 in accordance with equation (1) as follows:

Phase difference=$2\pi \sin\theta \, d/\lambda$ (1)

Thus, both the interferometer and the IFM utilize N-channel phase receivers as a means for calculating the AOA and the frequency of the input signal, respectively.

OBJECTS AND SUMMARY OF THE INVENTION

It is an object of the present invention to provide an integrated interferometer and Instantaneous Frequency Measurement (IFM) receiver, which calculates the frequency and the angle-of-arrival (AOA) of input signals using a shared N-channel phase receiver.

It is a further object of the present invention to provide an integrated interferometer and IFM receiver, which is less costly to produce and maintain than interferometers and IFM devices manufactured as separate and distinct units.

It is still a further object of the present invention to provide an integrated interferometer and IFM receiver, which occupies less space than interferometers and IFM devices manufactured as separate and distinct units.

It is still a further object of the present invention to provide an integrated interferometer and IFM receiver, which is less complex to maintain than interferometers and IFM devices manufactured as separate and distinct units.

It is still a further object of the present invention to provide an integrated interferometer and IFM receiver, which is more easily calibrated than interferometers and IFM devices manufactured as separate and distinct units.

In accordance with one form of the present invention, an integrated receiver including an IFM, an interferometer and switches for selectively connecting the shared N-channel phase receiver to the IFM when the IFM is determining the frequency of the signals, and selectively connecting the shared N-channel phase receiver to the interferometer when the interferometer is determining the AOA of the signals is provided. The IFM receives signals from a target and determines the frequency of the signals. The IFM includes the shared N-channel phase receiver. The interferometer also receives the signals from the target and determines the AOA of the signals. The interferometer includes the shared N-channel phase receiver, and shares the shared N-channel phase receiver with the IFM. The shared N-channel phase receiver determines phase information indicative of the frequency of the signals and the AOA of the signals. The integrated receiver may also include an amplitude measurement circuit responsive to the signals, which determines amplitude-based parameters of the signals.

In accordance with another form of the present invention, a method for calculating the frequency and the AOA of the signals from the target is provided, which includes the steps of receiving the signals, determining the frequency of the signals using a shared N-channel phase receiver, and determining the AOA of the signals using the shared N-channel phase receiver. The method may also include the step of determining amplitude-based parameters of the signals.

Previously, interferometers and IFM devices were operated as separate and distinct units having unique N-channel phase receivers. By implementing an integrated interferometer and IFM, the same N-channel phase receiver may be shared between the interferometer and the IFM and used for both AOA and frequency measurements, respectively.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 2:
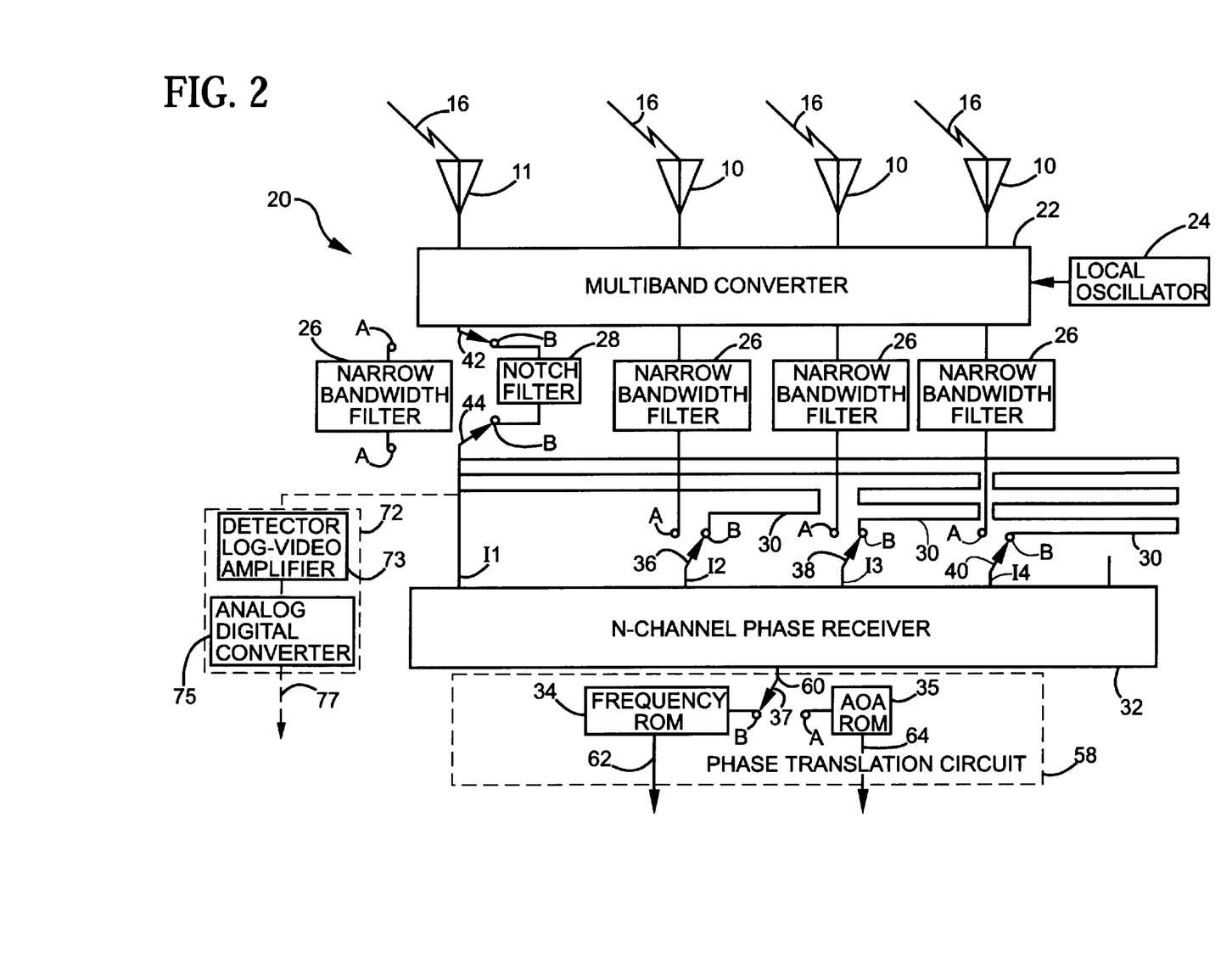
FIG. 2 is a block diagram of an integrated receiver for determining both the frequency and the angle-of-arrival (AOA) of input signals from a target using a shared N-channel phase receiver, formed in accordance with the present invention.

FIG. 2 illustrates a block diagram of an integrated receiver 20 for determining both the frequency and the angle-of-arrival (AOA) of input signals from a target using a shared N-channel phase receiver in accordance with the present invention. The integrated receiver 20 includes a plurality of receptor elements 10 (e.g., antennas), a reference receptor element 11 (e.g., an antenna), a multiband converter 22, a tunable local oscillator 24, narrow bandwidth filters 26, a notch filter 28, delay lines 30, an N-channel phase discriminator, phase correlator or phase receiver 32, a frequency read-only memory (ROM) 34, an AOA ROM 35 and switches 36–44. Each of the switches 36–44 is selected to make contact with corresponding terminals A during AOA measurements, or corresponding terminals B during frequency measurements.

Figure 3:
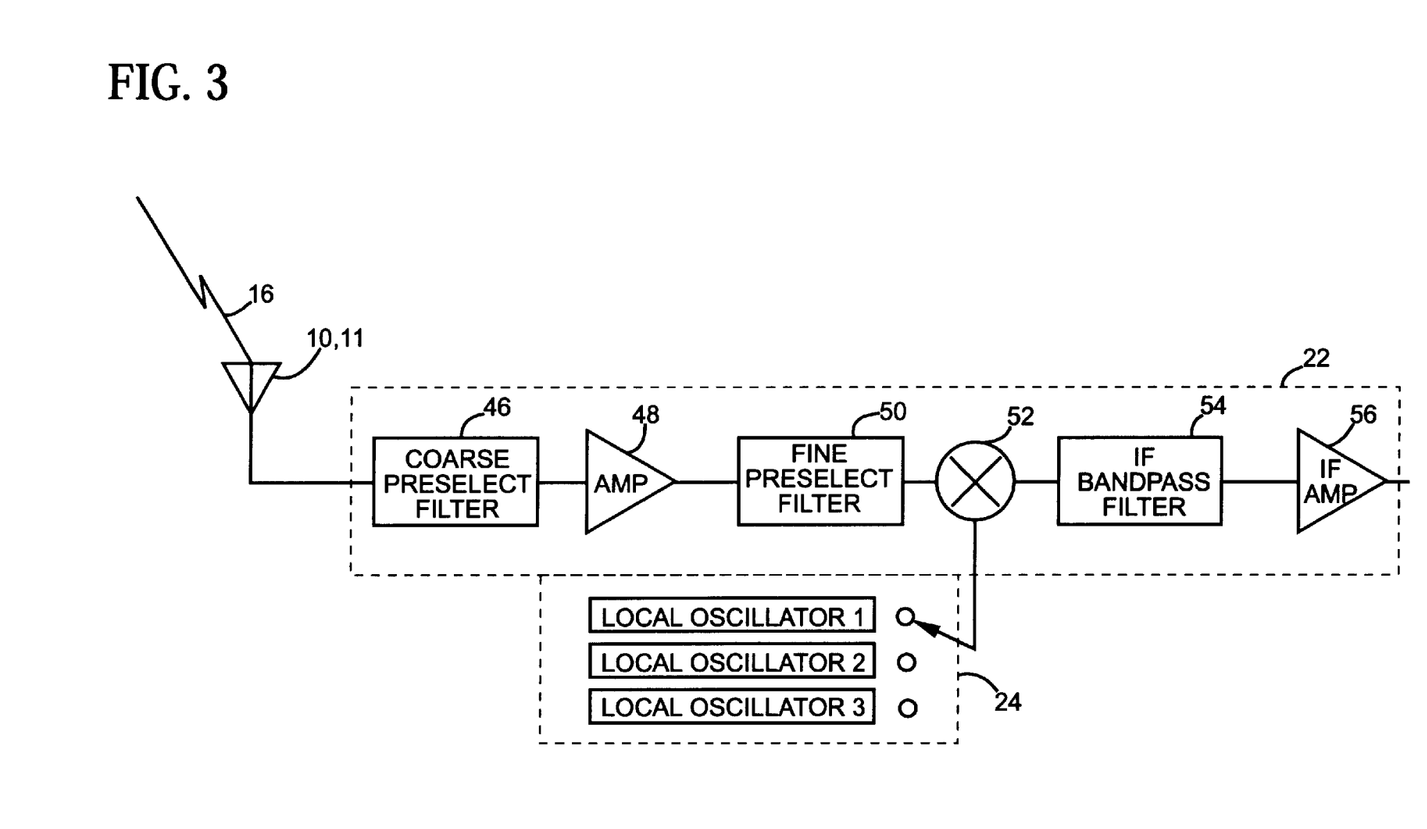
FIG. 3 is a block diagram of a receptor element, multiband converter and local oscillator suitable for use in the integrated receiver of the present invention.

During frequency measurements, the input signals 16 are received by the reference receptor element 11 and directed to the multiband converter 22. FIG. 3 illustrates a block diagram of one embodiment of the multiband converter 22, which is suitable for use in the present invention. The multiband converter 22 includes a coarse preselect filter 46 responsive to the input signals 16 received by the receptor elements 10 and 11, an amplifier 48 coupled to the output of the coarse preselect filter 46, a fine preselect filter 50 coupled to the output of the amplifier 48, a mixer 52 which receives the output signal from the fine preselect filter 50 and selectable signals of various frequencies from the local oscillator 24 to down convert the received radio frequency (RF) signals to intermediate frequency (IF) signals, a wide bandwidth filter or IF bandpass filter 54 coupled to the IF output of the mixer 52, and an IF amplifier 56 coupled to the output of the IF filter 54. The IF bandpass filter 54 preferably has a wide bandwidth (for example, at least 500 MHZ). The local oscillator 24 includes a plurality of fixed or tunable local oscillators, which are switched through frequency bands of interest that the received RF signals are expected to occupy. The multiband converter 22 essentially functions to down convert the received RF signals to an intermediate frequency by means well known in the art. Further detail regarding the multiband converter and other superheterodyne concepts is provided in R. C. Dorf, *Electrical Engineering Handbook,* IEEE Press (1993), which is hereby incorporated by reference in its entirety.

Referring again to FIG. 2, the down converted IF signals from the multiband converter 22 are directed to the notch filter 28 via switch 42. The notch filter 28 is typically tunable and essentially functions to filter out continuous wave (CW) interference in the down converted IF signals. An example of a commercially available, tunable notch filter includes a ferrite device, and is based on yttrium—iron—garnet (YIG). Such a bandpass or band reject device is available from Micro Lambda Corporation, 48041 Fremont Blvd., Fremont, Calif. 94538. The output of the notch filter 28 is fed via switch 44 to a multiple tap delay line 30, which terminates in distinct inputs I1–I4 of the N-channel phase receiver 32.

Figure 4A:
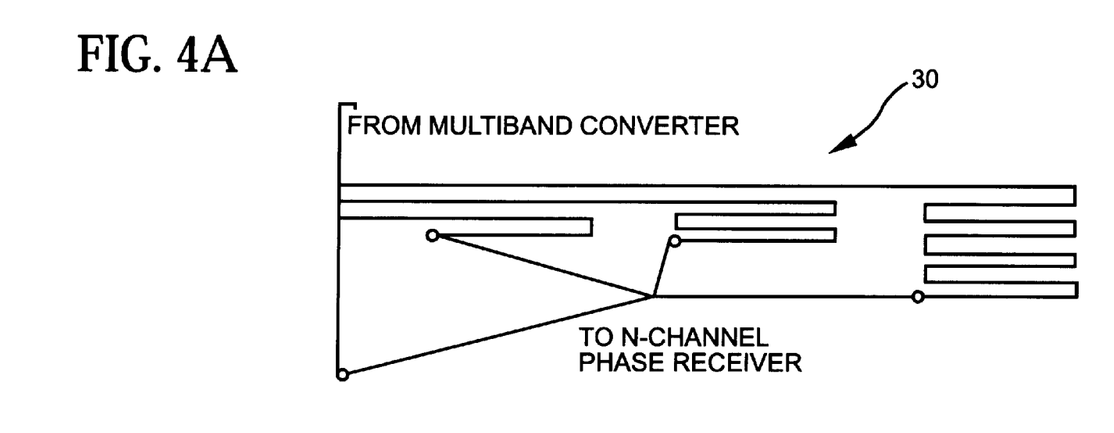
FIG. 4A is a delay line of the prior art, which is configured in lengths forming a binary set of half wavelengths suitable for use in the integrated receiver of the present invention.
Figure 4B:
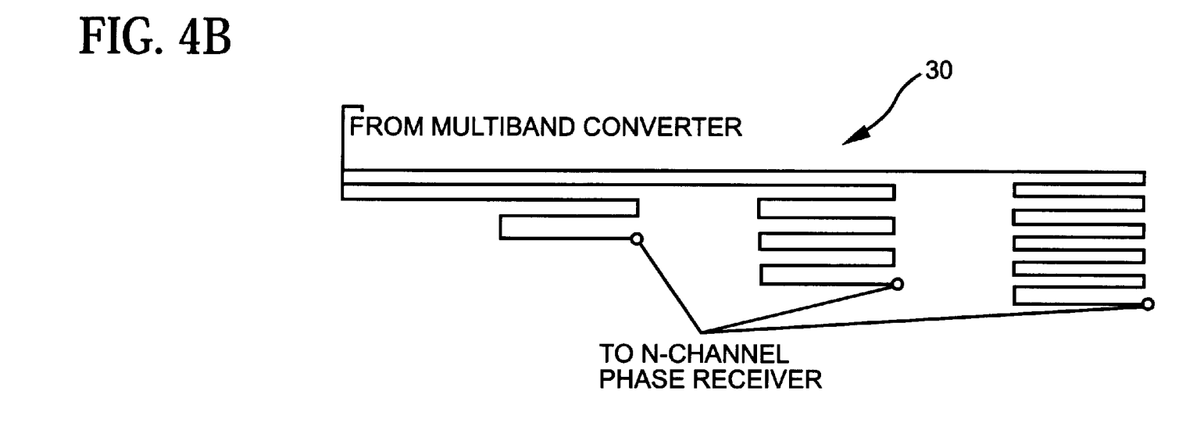
FIG. 4B is a delay line of the prior art, which is configured in lengths forming relatively prime ratios of half wavelengths suitable for use in the integrated receiver of the present invention.

The delay line 30 can be configured in lengths forming a binary set of half wavelengths, or in lengths forming relatively prime ratios of half wavelengths, lengths being determined at the highest intermediate frequency. FIG. 4A illustrates the delay line 30 configured in the binary set of half wavelengths including taps for 1, 2, 4 and 8 half wavelengths. Such a configuration is often used in Instantaneous Frequency Measurement (IFM) devices. FIG. 4B illustrates a configuration of the delay line 30 in lengths forming relatively prime ratios of half wavelengths including taps for 3, 7 and 11 half wavelengths. This configuration of lengths is copied from the spacings often used between receptor elements in interferometers, which is not practiced in the prior art of IFM devices. The configuration in FIG. 4B requires fewer delay line lengths for a given accuracy of frequency measurement than that in the configuration illustrated in FIG. 4A. The lengths of the delay line 30 illustrated in FIGS. 4A and 4B are not drawn to any particular scale, and are merely intended as illustrative examples without limiting the scope of the present invention in any form.

Figure 5:
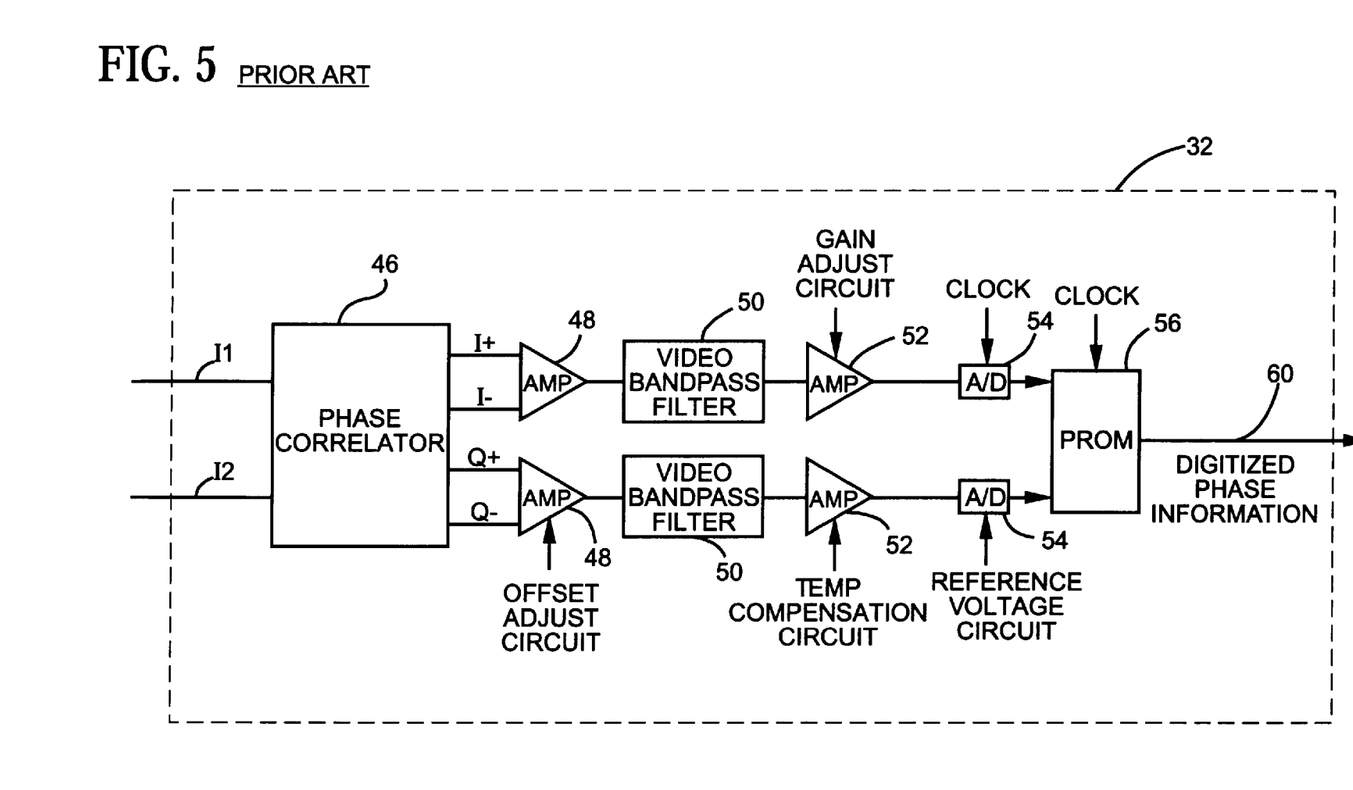
FIG. 5 is a block diagram of a dual channel phase receiver of the prior art.

FIG. 5 illustrates a block diagram of one embodiment of a phase receiver 32 well known in the prior art, but suitable for use in the present invention. The phase receiver 32 includes a phase correlator 46, IQ amplifiers 48, video bandpass filters 50, video amplifiers 52, analog-to-digital converters 54 and a memory or programmable-read-only memory (PROM) 56. Although only two channels of the phase receiver 32 are illustrated in FIG. 5, the concepts discussed below with respect to the dual channel phase receiver 32 illustrated in FIG. 5 may be extended to N-channel phase receivers by means well known in the art. The phase correlator 46 measures the phase difference between inputs I1 and I2 and outputs differential quadrature video signals I+, I–, Q+ and Q–. The differential quadrature video signals vary sinusoidally as the phase varies between the signals input at I1 and I2. The differential quadrature video signals are applied to differential IQ amplifiers 48 or alternative, substantially equivalent summing devices. Each output of the IQ amplifiers 48 is then filtered to the appropriate video bandwidth by the video bandpass filters 50.

The voltages of the differential quadrature video signals I+, I–, Q+ and Q– typically require scaling to ensure that the maximum expected voltage corresponds to the maximum voltage required by the analog-to-digital converters 54. Gain adjustment, offset adjustment, and temperature compensation circuits are commonly required to maintain the differential quadrature video signals within a predetermined range of acceptable voltages, thereby enabling the analog-to-digital converters 54 to reduce errors due to dynamic range variations. The outputs of the video amplifiers 52 are fed into ladder type analog-to-digital converters 54, which typically digitize these signals into eight bits of information. Such analog-to-digital converters 54 require a stable and precise voltage reference circuit and a clock. The digitized information is then applied to the PROM 56, which performs the Arc Tan function, and outputs digitized phase information 60 representing the phase difference between the I1 and I2 inputs.

Referring again to FIG. 2, a phase translation circuit 58 converts the digitized phase information 60 embodied in the output signal from the N-channel phase receiver 32 to frequency information 62 embodied in an output signal from the translation circuit 58. The digitized phase information 60 is used to address the frequency read-only memory (ROM) 34. The data at the address in the frequency ROM 34 pointed to by the digitized phase information 60 represents the frequency of the input signals 16 corresponding to the digitized phase difference 60. This data is outputted as a signal from the phase translation circuit 58, and corresponds to frequency information 62.

During AOA measurements, the input signals 16 are received by the receptor elements 10 and reference receptor element 11 and directed to separate channels of the multi-band converter 22. Since each of the switches 36A4 is selected to make contact with terminals A during AOA measurements, the outputs of the multiband converter 22 are applied to the narrow bandwidth filters 26. The narrow bandwidth filters 26 are typically bandpass filters having a preferred narrow bandwidth of approximately 10 MHZ. The output signals from the narrow bandwidth filters 26 are provided through switches 36–40 and 44 to the N-channel phase receiver 32 at inputs I1–I4. The N-channel phase receiver 32 determines the phase difference associated with inputs I2–I4 relative to a reference input such as input I1.

The phase translation circuit 58 converts the digitized phase information 60 from the N-channel phase receiver 32 to AOA information 64. The digitized phase information 60 is used to address the AOA read-only memory (ROM) 35. The data at the address in the AOA ROM 35 pointed to by the digitized phase information 60 represents the AOA of the input signals 16 corresponding to the digitized phase information 60. This data is outputted as a signal from the phase translation circuit 58 and corresponds to AOA information 64.

The input I1 is optionally tapped just prior to the N-channel phase receiver 32 and applied to an amplitude measurement circuit 72 including a detector/log video amplifier 73 and an analog-to-digital converter 75. The amplitude measurement circuit 72 derives amplitude-based parameters from the input signals received from the reference receptor element 11 such as pulse width, pulse repetition rate or frequency and amplitude. The amplitude information is then optionally digitized and output as pulse descriptor information 77.

Figure 6:
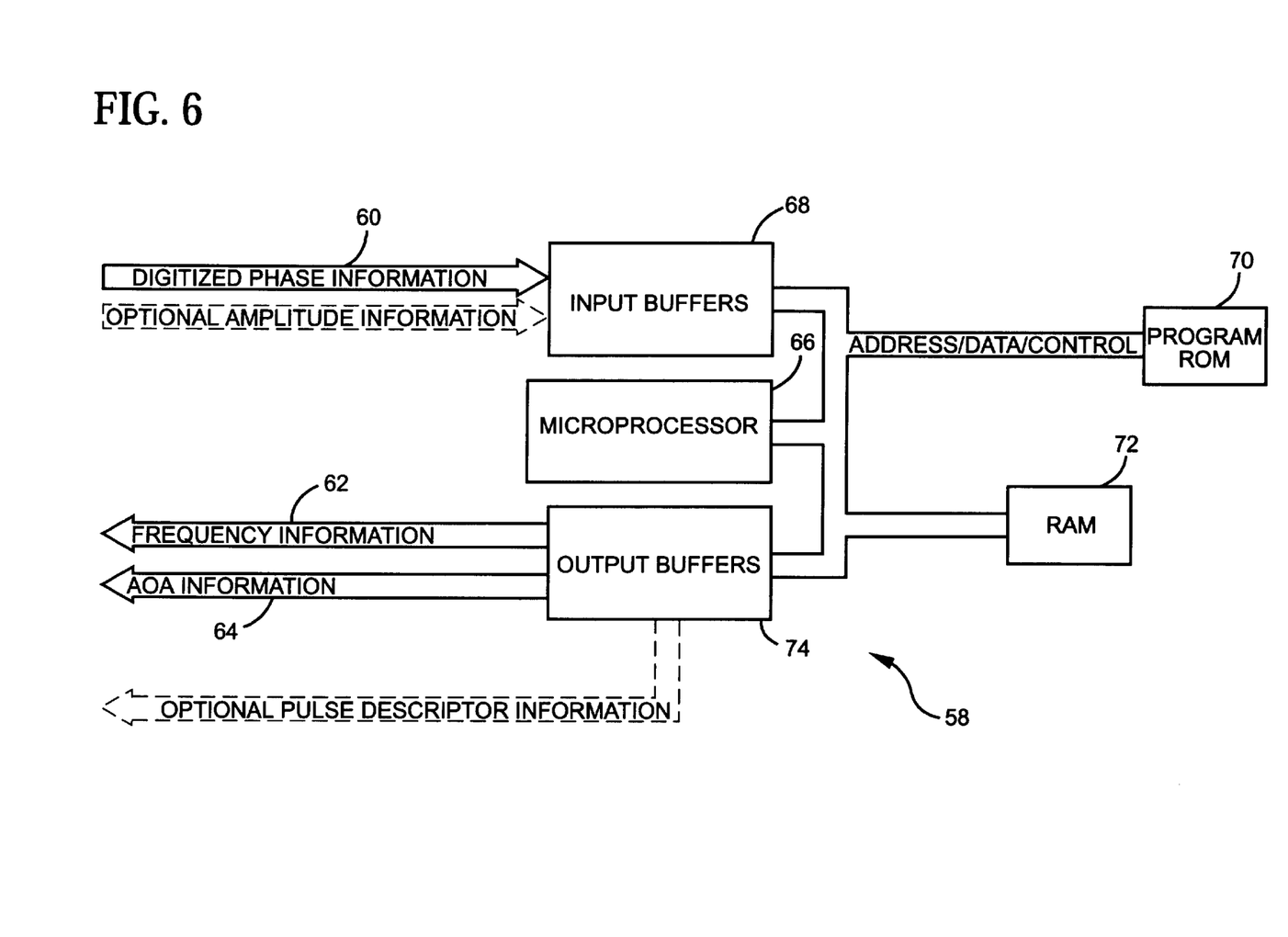
FIG. 6 is a block diagram of a second embodiment of a phase translation circuit illustrated in FIG. 2.

Alternatively, a second embodiment of the phase translation circuit 58 illustrated in FIG. 2 includes a microprocessor 66, input buffers 68, program ROM 70, random-access memory (RAM) 72 and output buffers 74 linked by an address/data/control bus as illustrated in FIG. 6. The digitized phase information 60 is applied to the input buffers 68 by the N-channel phase receiver 32. The microprocessor 66 reads the digitized phase information 60 from the input buffers 68 and converts it to either frequency information 62 or AOA information 64 using software residing in the program ROM 70 and variables residing in the RAM 72. The microprocessor 66 then writes the frequency or AOA information to the output buffers 74, which output the frequency information 62 and the AOA information 64.

Figure 7A:
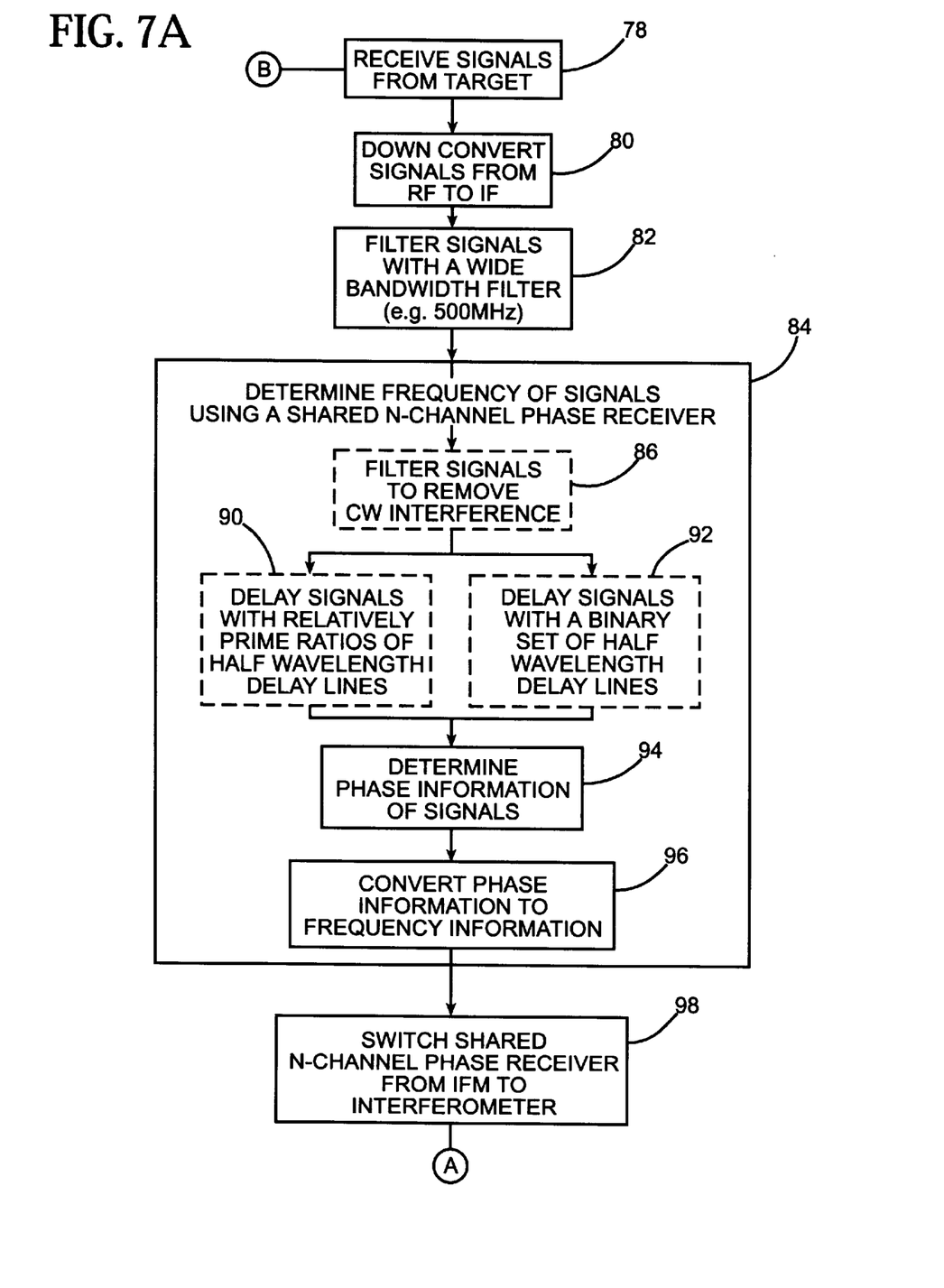
FIGS. 7A and 7B are flowcharts of a method of the present invention for determining both the frequency and the AOA of the input signals using a shared N-channel phase receiver.
Figure 7B:
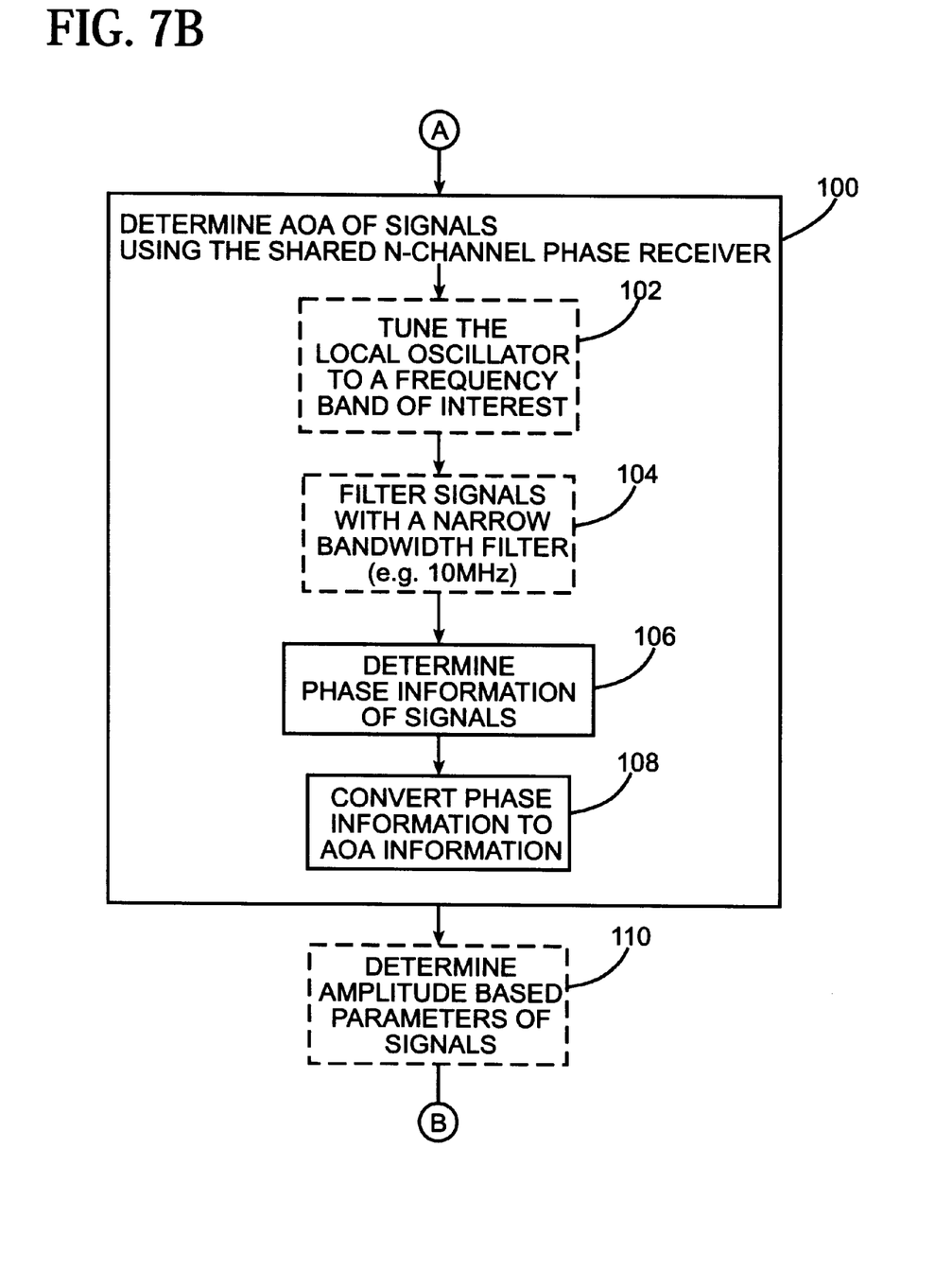

FIGS. 7A and 7B illustrate a flowchart of a method for determining both the frequency and the AOA of the input signals using the shared N-channel phase receiver. The input signals are received in step 78 and down converted from RF frequencies to IF frequencies in step 80. The down converted input signals are then filtered with a filter having a wide bandwidth (for example, at least 500 MHZ) in step 82.

The frequency of the input signals is then determined in step 84, which may include filtering the input signals to remove CW interference in step 86. In order to determine the frequency, the input signals are delayed using delay lines configured in relatively prime ratios of half wavelengths in step 90 or using delay lines configured in a binary set of half wavelengths in step 92. The phase difference between the input signals or the phase information is then determined by the shared N-channel phase receiver in step 94 and converted to frequency information indicative of the frequency of the input signals in step 96.

Following the determination of the frequency of the input signals in step 84 and prior to the determination of the AOA in step 100, the shared N-channel phase receiver is switched from the IFM, which is used to determine the frequency, to the interferometer, which is used to determine the AOA in step 98. During the determination of the AOA of the input signals, the local oscillator may be tuned to a frequency band of interest in step 102 and the signals may be filtered using a narrow bandwidth of approximately 10 MHZ in step 104. The phase difference between the input signals or phase information is then determined in step 106 and converted to AOA information indicative of the AOA of the input signals in step 108. Following the determination of the AOA of the input signals in step 100, the amplitude-based parameters of the input signals may be determined in step 110. Following step 100 or step 108, the method returns to step 78 in order to receive additional input signals from the target.

The following modifications to the embodiments of the present invention described above are considered well within the scope of the present invention:

1. altering the quantity and type of receptor elements and/or reference receptor elements (greater resolution and accuracy is achieved in measuring the phase difference and ultimately the AOA and the frequency of the input signals as the number of receptor elements is increased);
2. altering the characteristics of the wide and narrow bandwidth filters and notch filters including such parameters as bandwidth, cutoff frequency, and passband;
3. altering the configuration of the delay lines to something other than a binary set or relatively prime ratios such as a fixed or exponential progression of lengths;
4. altering the implementation of the multiband converter to any of numerous alternative designs well known in the art; and
5. altering the implementation of the N-channel phase receiver to any of numerous alternative designs well known in the art.

Thus, the integrated interferometer and IFM receiver of the present invention calculates the frequency and the AOA of the input signals using a shared N-channel phase receiver. By virtue of the fact that only one N-channel phase receiver is required, the integrated receiver is less costly and less complex to produce and maintain; occupies less space; and is more easily calibrated than interferometers and IFM devices manufactured as separate and distinct units.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An integrated receiver comprising:

an Instantaneous Frequency Measurement Device (IFM), the IFM receiving signals from a target and determining a frequency of the signals, the IFM including a shared N-channel phase receiver; and an interferometer, the interferometer also receiving the signals from the target and determining an angle-of-arrival (AOA) of the signals, the interferometer including the shared N-channel phase receiver and sharing the shared N-channel phase receiver with the IFM, the shared N-channel phase receiver being selectively connected to the IFM when the IFM is determining the frequency of the signals, the shared N-channel phase receiver being selectively connected to the interferometer when the interferometer is determining the AOA of the signals, the shared N-channel phase receiver determining phase information indicative of the frequency of the signals and the AOA of the signals.

2. An integrated receiver as defined by claim 1, further comprising a local oscillator and a multiband converter, the multiband converter being coupled to the shared N-channel phase receiver, the local oscillator being coupled to the multiband converter, the multiband converter down converting the signals from a radio frequency (RF) to an intermediate frequency (IF).

3. An integrated receiver as defined by claim 2, wherein the multiband converter includes a coarse preselect filter responsive to the signals from the target, an amplifier coupled to the coarse preselect filter, a fine preselect filter coupled to the amplifier, a mixer coupled to the fine preselect filter and the local oscillator, a wide bandwidth filter coupled to the mixer, and an IF amplifier coupled to the wide bandwidth filter and the shared N-channel phase receiver.

4. An integrated receiver as defined by claim 1, wherein the interferometer includes a narrow bandwidth filter responsive to the signals and coupled to the shared N-channel phase receiver.

5. An integrated receiver as defined by claim 1, wherein the IFM includes at least two delay lines configured in relative lengths to form relatively prime ratios of half wavelengths, the delay lines being responsive to the signals and coupled to the shared N-channel phase receiver.

6. An integrated receiver as defined by claim 1, wherein the IFM includes delay lines configured in lengths forming a binary set of half wavelengths, the delay lines being responsive to the signals and coupled to the shared N-channel phase receiver.

7. An integrated receiver as defined by claim 1, wherein the IFM further includes a notch filter responsive to the signals and coupled to the shared N-channel phase receiver, the notch filter being tuned to substantially remove continuous wave interference in the signals.

8. An integrated receiver as defined by claim 1, further comprising a memory, the memory being coupled to the shared N-channel phase receiver, the memory converting the phase information from the shared N-channel phase receiver into frequency information indicative of the frequency of the signals.

9. An integrated receiver as defined by claim 1, further comprising a memory, the memory being coupled to the shared N-channel phase receiver, the memory converting the phase information from the shared N-channel phase receiver into AOA information indicative of the AOA of the signals.

10. An integrated receiver as defined by claim 1, further comprising a phase translation circuit, the phase translation circuit being coupled to the shared N-channel phase receiver, the phase translation circuit including a microprocessor which converts the phase information from the shared N-channel phase receiver into frequency information indicative of the frequency of the signals.

11. An integrated receiver as defined by claim 1, further comprising a phase translation circuit, the phase translation circuit being coupled to the shared N-channel phase receiver, the phase translation circuit including a microprocessor which converts the phase information from the shared N-channel phase receiver into AOA information indicative of the AOA of the signals.

12. An integrated receiver as defined by claim 1, further comprising an amplitude measurement circuit responsive to the signals, the amplitude measurement circuit determining amplitude-based parameters of the signals.

13. A method for calculating a frequency and an angle-of-arrival (AOA) of signals from a target, comprising the steps of:

receiving the signals;

determining the frequency of the signals using a shared N-channel phase receiver; and determining the AOA of the signals using the same shared N-channel phase receiver used for determining the frequency of the signals.

14. A method for calculating a frequency and an AOA of signals from a target as defined by claim 13, further comprising the step of filtering the signals with a filter having a wide bandwidth.

15. A method for calculating a frequency and an AOA of signals from a target as defined by claim 13, wherein the step of determining the AOA includes the step of filtering the signals with a filter including a narrow bandwidth.

16. A method for calculating a frequency and an AOA of signals from a target as defined by claim 13, wherein the step of determining the AOA includes the step of down-converting the signals from a frequency band of interest by tuning a local oscillator.

17. A method for calculating a frequency and an AOA of signals from a target as defined by claim 13, wherein the step of determining the frequency includes the steps of:

delaying the signals selectively using delay lines configured in lengths forming a binary set of half wavelengths to generate delayed signals; and providing the delayed signals to the shared N-channel phase receiver.

18. A method for calculating a frequency and an AOA of signals from a target as defined by claim 13, wherein the step of determining the frequency includes the steps of:

delaying the signals selectively using delay lines configured in lengths forming relatively prime ratios of half wavelengths to generate delayed signals; and providing the delayed signals to the shared N-channel phase receiver.

19. A method for calculating a frequency and an AOA of signals from a target as defined by claim 13, wherein the step of determining the frequency includes the step of filtering the received input signals selectively to substantially remove continuous wave interference in the signals.

20. A method for calculating a frequency and an AOA of signals from a target as defined by claim 13, wherein the step of determining the frequency includes the steps of:

determining phase information of the signals using the shared N-channel phase receiver; and converting the phase information from the shared N-channel phase receiver to frequency information indicative of the frequency of the signals.

21. A method for calculating a frequency and an AOA of signals from a target as defined by claim 13, wherein the step of determining the AOA includes the steps of:

determining phase information of the signals using the shared N-channel phase receiver; and converting phase information from the shared N-channel phase receiver to AOA information indicative of the AOA of the signals.

22. A method for calculating a frequency and an AOA of signals from a target as defined by claim 13, further comprising the step of determining amplitude-based parameters of the signals.

* * * * *